US012625387B2

(12) United States Patent
Wienicke

(10) Patent No.: US 12,625,387 B2
(45) Date of Patent: May 12, 2026

(54) CENTRAL PART FOR AN EYEGLASS HINGE, AND EYEGLASSES HAVING A CENTRAL PART OF THIS TYPE

(71) Applicant: OBE GMBH & CO. KG, Ispringen (DE)

(72) Inventor: Frank Wienicke, Birkenfeld (DE)

(73) Assignee: OBE GMBH & CO. KG, Ispringen (DE)

( * ) Notice: Subject to any disclaimer, the term of this patent is extended or adjusted under 35 U.S.C. 154(b) by 455 days.

(21) Appl. No.: 18/022,340

(22) PCT Filed: Aug. 16, 2021

(86) PCT No.: PCT/EP2021/072765
§ 371 (c)(1),
(2) Date: Feb. 21, 2023

(87) PCT Pub. No.: WO2022/038103
PCT Pub. Date: Feb. 24, 2022

(65) Prior Publication Data
US 2023/0324716 A1 Oct. 12, 2023

(30) Foreign Application Priority Data
Aug. 21, 2020 (DE) .......................... 102020210683.5

(51) Int. Cl.
*G02C 5/22* (2006.01)
(52) U.S. Cl.
CPC ......... *G02C 5/2227* (2013.01); *G02C 5/2263* (2013.01); *G02C 2200/26* (2013.01)
(58) Field of Classification Search
CPC . G02C 5/2227; G02C 5/2263; G02C 2200/26
(Continued)

(56) References Cited

U.S. PATENT DOCUMENTS 1,936,319 A * 11/1933 Wingate ................... G02C 5/08
351/63
4,832,479 A 5/1989 Beyer
(Continued)

FOREIGN PATENT DOCUMENTS

CN 203178596 U 9/2013
CN 103792680 A 5/2014
(Continued)

OTHER PUBLICATIONS

Notice of Reasons for Refusal issued by the Japanese Patent Office on Mar. 4, 2025 in corresponding JP Patent Application No. 2023-512373, with English translation.
(Continued)

*Primary Examiner* — George G. King
(74) *Attorney, Agent, or Firm* — Carter, DeLuca & Farrell LLP; Geroge Likourezos

(57) ABSTRACT

A central part for an eyeglass hinge includes first articulation region, which is designed to connect, with articulation about a first articulation axis, the central part to a frame of eyeglasses; a second articulation region, which is designed to connect, with articulation about a second articulation axis, the central part to a temple of the eyeglasses; and a cable guide opening, which extends through the central part perpendicularly to the articulation axes and is designed for the feeding of a cable from the temple to the frame through the central part, the cable guide opening being open in the direction of the articulation axes at least on one side.

15 Claims, 7 Drawing Sheets

Figure 1:
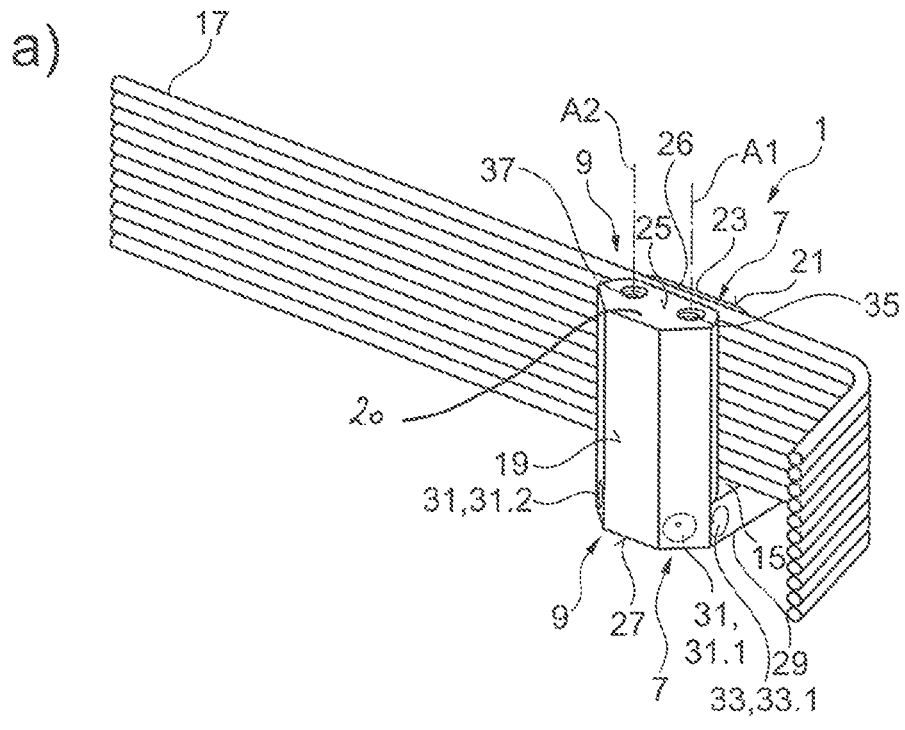
Figure 1:
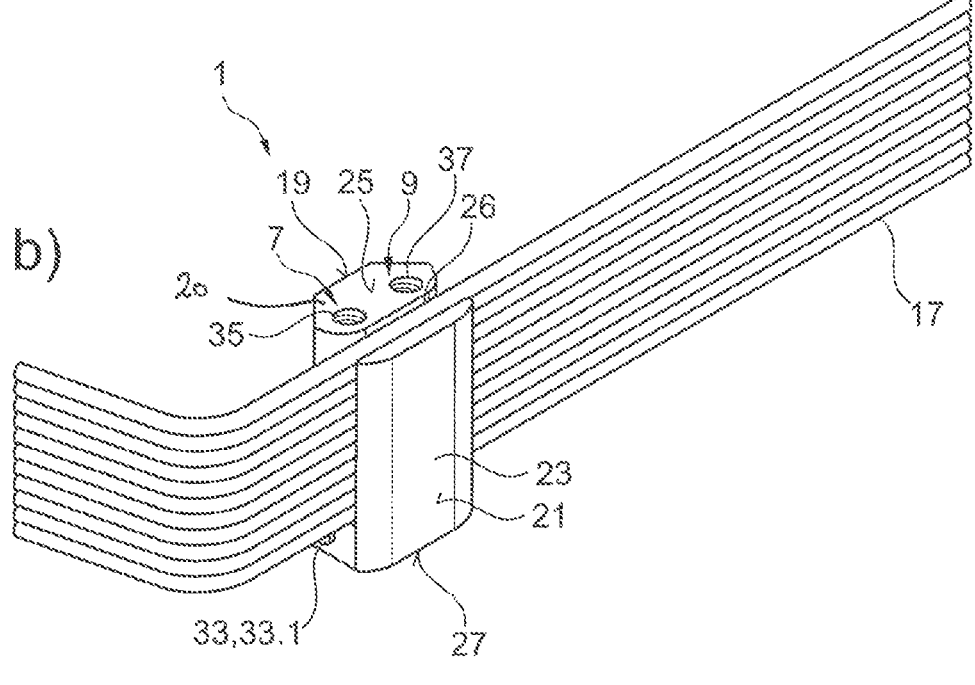

(58) Field of Classification Search
USPC ............................................ 351/153; 16/228
See application file for complete search history.

(56)                    References Cited

U.S. PATENT DOCUMENTS

| | | | |
|---|---|---|---|
| 5,606,743 A | 2/1997 | Vogt | |
| 10,670,888 B1 | 6/2020 | Yang | |
| 2018/0049664 A1 | 2/2018 | Miyazaki | |
| 2018/0252940 A1 | 9/2018 | Rabut | |
| 2019/0129200 A1 | 5/2019 | Moskowitz | |
| 2019/0265510 A1* | 8/2019 | Eriksson | G02C 5/22 |
| 2020/0174281 A1 | 6/2020 | Gui | |
| 2024/0098918 A1* | 3/2024 | Eriksson | H01R 35/04 |

FOREIGN PATENT DOCUMENTS

| | | | |
|---|---|---|---|
| CN | 108139597 A | 6/2018 | |
| EP | 0266307 A1 | 5/1988 | |
| JP | S63-115128 A | 5/1988 | |
| JP | 2011-002706 A | 1/2011 | |
| LU | 100476 B1 | 5/2019 | |
| WO | 2018084772 A1 | 5/2018 | |

OTHER PUBLICATIONS

International Preliminary Report on Patentability issued by the International Bureau of WIPO in connection with International Application No. PCT/EP2021/072765, dated Feb. 16, 2023. (English Translation).

International Search Report issued in corresponding International Application No. PCT/EP2021/072765, dated Dec. 3, 2021, pp. 1-2, English Translation.

Chinese Office Action issued by the China National Intellectual Property Administration on Feb. 20, 2025 in corresponding CN Patent Application No. 202180051698.8, with English translation.

* cited by examiner a)

b)

a)

b)

CENTRAL PART FOR AN EYEGLASS HINGE, AND EYEGLASSES HAVING A CENTRAL PART OF THIS TYPE

CROSS REFERENCE TO RELATED APPLICATIONS

The present application is a national stage application of International Application No. PCT/EP2021/072765, filed Aug. 16, 2021, which claims priority to German Patent Application No. 102020210683.5, filed Aug. 21, 2020, the entire contents of which are incorporated herein by reference in their entirety.

The invention relates to a central part for an eyeglass hinge and to eyeglasses with such a central part.

Eyeglasses with electronic functions, such as data eyeglasses, augmented reality eyeglasses, also known as AR eyeglasses, or virtual reality eyeglasses, also known as VR eyeglasses, are becoming increasingly important. In such eyeglasses, an electronic functional element, for example a display device or the like, is typically integrated into a frame of the eyeglasses or arranged on the frame, wherein a control device, for example a controller and/or an electrical storage device, for example a battery or accumulator, is integrated into a temple of the eyeglasses or arranged on the temple. An energy- and/or data-transmitting connection is then required between the temple on the one hand and the frame on the other. For this purpose, a cable may be provided, be it an electrical cable or an optical cable, which must be passed over a hinge connecting the temple to the frame. Conventional eyeglasses and eyeglass hinges can hardly be used for this purpose and can also be retrofitted accordingly only with difficulty or at considerable expense. In particular, there is a need for a cable guide via the hinge, which is simple in design and protects the cable from outside the eyeglasses, while at the same time ensuring that the eyeglasses can be easily mounted and dismounted, especially for maintenance purposes. At the same time, functions typical of hinges, such as the most accurate possible definition of various functional positions for the temple, in particular a rest position and a wearing position, are to be ensured. It is also generally desirable to realize a so-called snap effect, whereby the temple is automatically displaced into at least one of the said functional positions as soon as it reaches or exceeds a certain limit angle range relative to the frame.

The invention is based on the problem of creating a central part for an eyeglass hinge as well as eyeglasses having such a central part, wherein advantages are provided at least to some extent over conventional eyeglass hinges, wherein in particular at least one of the aforementioned aspects is realized.

The problem is solved by providing the present technical teaching, in particular the teaching of the independent claims as well as the embodiments disclosed in the dependent claims and the description.

In particular, the problem is solved by providing a central part for an eyeglass hinge comprising a first articulation region adapted to articulate the central part about a first articulation axis to a frame of an eyeglasses. The central part has a second articulation region adapted to articulate the central part about a second articulation axis to a temple of the eyeglasses. The central part also has a cable guide opening penetrating it perpendicularly to the articulation axes, which is adapted to guide a cable from the temple to the frame through the central part, in particular an electronic cable or an optical cable, in particular a cable for power and/or data transmission. The cable guide opening is open at least on one side in the direction of the articulation axes. With the central part proposed here, in particular a simple and at the same time gentle as well as safe guidance of a cable from the temple to the frame can be provided.

In particular, eyeglasses having the central part can be easily mounted by hinging the central part to the frame in the first articulation region and hinging it to the temple in the second articulation region. Thus, an eyeglass hinge for the eyeglasses is formed at the same time, with the frame, the temple and the central part together forming the eyeglass hinge.

The cable is already protected by the fact that a pivoting movement of the temple relative to the frame from a rest position to a wearing position and back is divided into two partial pivoting movements, namely a first partial pivoting movement of the central part relative to the frame about the first articulation axis, and a second partial pivoting movement of the temple relative to the central part about the second articulation axis. In order to realize the full pivoting angle of the temple relative to the frame of typically about 90°, only a significantly reduced pivoting angle is required with respect to each of the two partial pivoting movements, in particular—with symmetrical division of the pivoting movement into the two partial pivoting movements—a respective partial pivoting movement of about 45°. Thus, in the area of a transition from the temple to the central part on the one hand and from the central part to the frame on the other hand, the cable is bent at least by less than 90°, preferably by about 45° in each case.

Furthermore, the central part advantageously protects the cable in particular from effects from outside the eyeglasses.

The pivoting movement of the temple relative to the frame preferably takes place about an imaginary hinge axis, which is not materially configured or manifested in the hinge. Rather, the pivoting movement about the imaginary hinge axis results from the preferably constrained movement of the temple relative to the frame, which is given by the two partial pivoting movements about the two articulation axes. However, it is also possible that the swivel movement is more complex, in particular as a superposition of a plurality of movements, wherein in particular the imaginary hinge axis itself is not fixed in space, but is displaced along a certain path.

The central part proposed here is advantageously simple and inexpensive to manufacture as well as easy to mount on eyeglasses, in particular by connecting the first articulation region to the frame and the second articulation region to the temple.

Since the cable guide opening is open on at least one side, the cable for mounting the central part can be easily inserted therein by inserting it into the cable guide opening from the open side. In particular, there is no need for complicated threading of the cable into or through the cable guide opening. Moreover, this embodiment particularly facilitates disassembly of the eyeglasses, wherein the cable does not have to be separated from the frame and the temple or from any electrical or electronic component in order to remove the central part from the eyeglasses and, in particular, from the cable. Rather, the central part can be easily removed from the cable laterally via the cable guide opening which is open on one side, which in particular makes maintenance or modification of the eyeglasses much easier.

According to a preferred embodiment, the central part is configured in one piece. The assembly and disassembly of the central part is particularly easy if it is configured in one piece. The fact that the central part is configured in one piece means in particular that the central part consists only of a basic body which has in particular the two articulation regions and the cable guide opening. In particular, the central part is preferably of unitary material design.

In particular, because the central part can be easily mounted and dismounted, it can also be retrofitted without difficulty to existing eyeglasses. In addition, it has a universally applicable, unobtrusive design.

According to a further development of the invention, it is provided that the central part has an innerside facing the face of a wearer of the eyeglasses when mounted on the eyeglasses and an outerside facing away from the face of the wearer.

The directional and spatial orientation terms used herein and in the following preferably refer to an arrangement of the central part and the eyeglasses on the face of a wearer of the eyeglasses, in short, wearer of the eyeglasses, in the intended state, with the wearer of the eyeglasses in an upright, standing body posture with a straight-ahead gaze. In this context, "inside" means "facing the face of the wearer of the eyeglasses", "outside" means "facing away from the face of the wearer of the eyeglasses", "above" means "geodetically above" and "below" means "geodetically below".

The cable guide opening is preferably closed to the outerside. In particular, the central part preferably has an outer wall which bounds the cable guide opening to the outside. This protects the cable in a particularly favorable manner from impacts from outside the eyeglasses, both in the wearing position and in particular in the rest position, when the outerside of the central part is exposed to the outside due to the eyeglasses temple being folded in against the frame.

The wearing position of the temple is in particular such a functional position in which the temple is arranged at an angle of approximately 90° to the frame, such that a wearer can put on and wear the eyeglasses. The rest position, in contrast, is a functional position in which the eyeglasses temple extends approximately parallel to the frame and is folded in such a way that the eyeglasses, on the one hand, cannot be worn, but, on the other hand, can be safely stowed and transported, for example, in an eyeglasses case.

The cable guide opening is preferably closed towards the innerside. In particular, the central part preferably has an inner wall which bounds the cable guide opening inwardly. In particular, the cable guide opening is preferably closed both to the outerside and to the innerside. In particular, the central part preferably has both the outer wall and the inner wall.

In one embodiment of the central part, it is provided that the central part has at least one cooling structure, in particular at least one cooling fin, preferably a plurality of cooling fins, on the outerside, in particular on the outer wall. This enables a very efficient heat dissipation from an electronic functional element of an eyeglasses comprising the central part.

Alternatively or additionally, the central part preferably has at least one cooling structure, in particular at least one cooling fin, preferably a plurality of cooling fins, on the innerside, in particular on the inner wall. This embodiment also contributes to efficient heat dissipation from an electronic functional element of an eyeglasses comprising the central part. In a preferred embodiment, the central part has the at least one cooling structure both on the outerside and on the innerside, in particular both on the outer wall and on the inner wall.

According to a further embodiment of the invention, it is provided that the central part has, at least in an articulation region selected from the first articulation region and the second articulation region, a first latching element which is adapted to fix the rest position of the temple. The central part further comprises, in the at least one articulation region, a second latching element adapted to define the wearing position of the temple. In an advantageous embodiment, the first latching element and the second latching element enable at least slight latching of the temple and/or the frame on the one hand in the rest position and on the other hand in the wearing position. In this way, accurately defined functional positions for the temple relative to the frame are advantageously achieved. Preferably, a snap effect can be achieved with the aid of the latching elements, in particular in cooperation with a suitably designed, spring-loaded counter latching element on at least one of the eyeglasses elements, wherein the temple is automatically pushed into the nearest functional position once a predetermined limit angle range is reached, without requiring any further interaction by the wearer of the eyeglasses. In a particularly preferred embodiment, the central part between the first latching element and the second latching element is designed in such a way that a potential maximum must be overcome, as it were, in order for the counter latching element to be able to pass from the first latching element to the second latching element, wherein it is urged into the respective latching element in each case after the potential maximum has been overcome.

According to a further development of the invention, it is provided that at least one latching element, selected from the first latching element and the second latching element, is configured as a latching recess. This represents a particularly simple and easy-to-manufacture embodiment of the latching element. Preferably, the latching element is configured as a circular, preferably trough-shaped latching recess.

According to a further development of the invention, it is provided that the central part has, both in the first articulation region and in the second articulation region, in each case a first latching element for defining the rest position of the temple and in each case a second latching element for defining the wearing position of the temple. In particular, a first first latching element for defining the rest position and a first second latching element for defining the wearing position are arranged in the first articulation region. In the second articulation region, a second first latching element for defining the rest position and a second second latching element for defining the wearing position are arranged. Thus, the rest position and the wearing position can advantageously be defined in a particularly stable manner.

According to a further development of the invention, it is provided that the central part has an upperside and an underside as viewed in the direction of the articulation axes. In this case, the upperside is arranged geodetically at the top in the intended wearing positions of the central part on an eyeglasses—as explained above—and the underside is arranged geodetically at the bottom. At least in one articulation region, selected from the first articulation region and the second articulation region, the central part has on at least one side, selected from the upperside and the underside, a screw connection element for producing the articulated connection with the respectively associated eyeglass element, that is to say the temple or the frame. The screw connection element enables a simple and inexpensive articulated connection between the eyeglass element and the central part, which is at the same time stable. At the positions where no screw connection element is provided, the articulated connection may instead be provided in the form of a stub axle or projection engaging a suitable recess, wherein the stub axle or projection may be provided on the central part and the recess may be provided on the eyeglass element, or conversely the stub axle or projection may be provided on the eyeglass element and the recesses may be provided on the central part.

Preferably, the central part has a screw connection element in the at least one articulation region both on the upperside and on the underside.

Preferably, the central part has a screw connection element both in the first articulation region and in the second articulation region, in each case on at least one side selected from the upperside and the underside.

In particular, a embodiment is preferred in which a screw connection element is provided in each of the two articulation regions, i.e. the first articulation region and the second articulation region, on each of the two sides, i.e. on the upperside and on the underside, in order to produce the articulated connection with the respectively associated eyeglass element. In the first articulation region, therefore, a screw connection element is provided both on the upperside and on the underside in each case for producing the articulated connection with the frame; in the second articulation region, a screw connection element is provided both on the upperside and on the underside in each case for producing the articulated connection with the temple. This enables a particularly stable articulated connection of the central part to the eyeglass elements, which at the same time is also easy to separate.

According to a further development of the invention, it is provided that the screw connection element is configured as a thread. In particular, a suitable screw can engage in the thread in order to connect the central part to the associated eyeglass element in an articulated manner. In a preferred embodiment, the associated eyeglass element may have a through hole through which the screw engages to then mesh with the thread of the central part to provide the articulated connection between the eyeglass element and the central part.

According to another preferred embodiment, in particular to represent a particularly narrow eyeglass hinge, the screw connection element may also be formed as a through thread or through hole, wherein the through thread or through hole extends from the upperside to the underside in the associated articulation region. A counter-connection element, such as a screw or bolt, is then preferably inserted into the through hole or through thread from one side, selected from the upperside and the underside, whereby the central part is articulated to the associated eyeglass element. The screw can then cooperate, in particular, with a thread provided in the eyeglass element if the central part has a through hole as a screw connection element.

According to a further development of the invention, it is provided that the central part is configured from a metal. This represents an embodiment of the central part which is both stable and of high value, but at the same time simple and inexpensive to manufacture. Preferably, the central part consists of a metal. In particular, the term "metal" also includes a metal alloy.

In a preferred embodiment, the central part is configured from metal in a metal powder injection molding process. Alternatively, it is possible that the central part is configured from a metal in a sintering process. Alternatively, it is possible that the central part is configured from a metal in a generative manufacturing process, in particular an additive manufacturing process, preferably a powder bed based manufacturing process such as in particular selective laser melting or selective laser sintering. In this way, the central part can be manufactured very simply and preferably without mechanical reworking with high precision and freedom in the specific shape design.

According to an alternative preferred embodiment, the central part is configured from a plastic. Preferably, it consists of a plastic. In this way, the central part can be configured in particular to be very light and inexpensive. The plastic may in particular be a fiber-reinforced plastic. The central part is preferably manufactured by means of injection molding or generative manufacturing, in particular additive manufacturing.

According to a further development of the invention, it is provided that the cable guide opening is open on a first side in the direction of the articulation axes and closed on an opposite second side. On the second side, on which the cable guide opening is closed, the central part has a bottom side for the cable guide opening. In this embodiment, the cable can not only be easily inserted into the cable guide opening, but is also advantageously supported and guided by the bottom side. At the same time, disassembly of the central part is easily possible, in particular without having to separate the cable from the temple or frame, and/or from an electrical or electronic component to which the cable is connected.

In a particularly preferred embodiment, the cable guide opening is open on the upperside and closed on the underside, the bottom side being arranged on the underside of the central part. The cable is thus advantageously held in the cable guide opening and thus in the central part by gravity in the intended arrangement of the central part on a pair of eyeglasses worn by a wearer of the eyeglasses.

In one embodiment of the central part, it is provided that the central part is configured and, in particular, adapted to eyeglasses for which the central part is used in such a way that the cable guide opening is arranged in the region of an imaginary neutral fiber or zero line of the eyeglasses. In particular, a cable arranged in the cable guide opening can in this way run in the region of or preferably along the imaginary neutral fiber or zero line, so that a distance over which the cable is laid remains at least largely unchanged, preferably unchanged, between the rest position and the wearing position of the eyeglasses. Advantageously, it is thus possible in particular to avoid stretching and/or compression of the cable, at least to a large extent, and thereby to prevent the cable from being mechanically stressed or, in the worst case, pinched. In particular, the central part is preferably correspondingly adapted to a temple and a frame of the eyeglasses. In particular, the arrangement of the cable guide opening on the central part is matched accordingly.

In the context of the present technical teaching, an imaginary neutral fiber or zero line is understood to mean, in particular, an imaginary line which passes through the frame and the temple of the eyeglasses and whose length does not change when the temple of the eyeglasses is pivoted between the rest position and the wearing position. In deviation from the use of the terms "neutral fiber" or "zero line" in strength theory, it is possible and even preferred in the context of the present technical teaching that the imaginary neutral fiber or zero line does not run through material of the temple and the frame, but through recesses arranged in the temple on the one hand and in the frame on the other hand, in particular such recesses which are provided to accommodate at least one cable.

The problem is also solved by creating eyeglasses comprising a frame and a temple. In this context, the frame is in particular an element which encloses at least one eyeglass, in particular two eyeglasses, and holds them on the eyeglasses. In particular, the frame is a middle part of the eyeglasses. The temple is connected to the frame via a central part according to the invention or a central part according to one of the previously described embodiments so as to be pivotally movable between the already previously defined rest position and the likewise already previously defined wearing position. In connection with the eyeglasses, in particular the advantages already explained in connection with the central part are realized.

Preferably, the eyeglasses have two temples and two central parts, wherein a first temple, for example a left temple, is connected to the frame via a first central part, wherein a second temple, for example a right temple, is connected to the frame via a second central part.

In a preferred embodiment, the eyeglasses are data glasses, in particular augmented reality eyeglasses, or virtual reality eyeglasses. It is also preferably possible that the eyeglasses are configured as sensor eyeglasses, with at least one sensor, in particular for monitoring a physical condition of the wearer of the eyeglasses. Furthermore, it is preferably possible that the eyeglasses are configured as audio eyeglasses, in particular as an audio headset or with an audio headset.

According to a further development of the invention, it is provided that the frame is hingedly connected to the central part in the first articulation region thereof, wherein the temple is hingedly connected to the central part in the second articulation region thereof. The frame, the central part and the temple together form an eyeglass hinge of the eyeglasses.

This eyeglass hinge preferably has an imaginary hinge axis about which the temple pivots during its movement from the rest position to the wearing position—and vice versa.

The pivoting movement actually breaks down into two partial pivoting movements, namely a first partial pivoting movement of the central part about the first articulation axis relative to the frame, and a second partial pivoting movement of the temple about the second articulation axis relative to the central part. In particular, the eyeglass hinge thus configured does not in any case have a material hinge axis or a hinge axis materialized in the form of a shaft or the like.

According to a further development of the invention, it is provided that at least one eyeglass element, selected from the temple and the frame, comprises an elastically prestressed counter latching element arranged to cooperate with the first latching element of the central part associated with the eyeglass element to define the rest position and to cooperate with the second latching element of the central part associated with the eyeglass element to define the wearing position. Due to the elastic pretension, the counter latching element can be used to advantageously achieve the snap effect into the respective functional position, i.e. the wearing position and/or the rest position, as already described above.

In a preferred embodiment, both eyeglass elements, both the temple and the frame, each have such an elastically prestressed counter latching element. This enables a particularly pronounced and stable configuration of the snap effect and at the same time a stable, accurate and pronounced definition of the functional position.

According to a further development of the invention, it is provided that the counter latching element is configured as a spring-loaded piston guided in a locating hole of the respective eyeglass element. The first latching element and the second latching element are each configured as latching recesses into which the spring-loaded piston is pressed under pretension in the respectively assigned functional position, i.e. the rest position and the wearing position. This represents an equally simple, inexpensive to manufacture and stable configuration of the counter latching element.

Preferably, a helical spring is associated with the counter latching element as a preloading element, which is preferably arranged in the locating hole.

According to a further development of the invention, it is provided that a cable, in particular an electrical cable or an optical cable, is guided in the cable guide opening of the central part from the temple to the frame. In this case, the advantages already mentioned are realized in a particular manner.

According to a further development of the invention, it is provided that the cable is configured as a ribbon cable or as an FPC connector (Flexible Printed Circuit). In particular, in the case of a ribbon cable or FPC connector, the advantages already mentioned are realized in an advantageous manner.

In one embodiment of the eyeglasses, it is provided that at least one element, selected from the frame and the temple, has a heat dissipation recess through which a fluidic connection from a surrounding area to the outside, in particular the outer wall, of the central part is established, and/or through which the outside, in particular the outer wall, of the central part is accessible in the wearing position, that is, exposed to a surrounding area. In this way, heat can be efficiently dissipated from the central part so that it can advantageously contribute to cooling an electronic functional element of the eyeglasses.

Preferably, the central part has the at least one cooling structure on the outside and/or on the innerside.

In one embodiment of the eyeglasses, the heat dissipation recess is provided only on the temple. In another embodiment of the eyeglasses, the heat dissipation recess is provided only on the frame.

In another embodiment of the eyeglasses, the heat dissipation recess is formed by a first partial recess formed on the temple and a second partial recess formed on the frame, at least in the wearing position, wherein the heat dissipation recess is formed in the wearing position by combining the two partial recesses into the heat dissipation recess by pivoting the temple relative to the frame into the wearing position.

In yet another embodiment, the temple has a first heat dissipation recess that provides a first fluidic connection to the outside of the central part, wherein at the same time the frame has a second heat dissipation recess that provides a second fluidic connection to the outside of the central part. Overall, a flow path is formed in this way through which air can flow from the surrounding area via the first fluidic connection to the outside of the central part and exit back into the surrounding area via the second fluidic connection. In this way, a cooling air flow can be realized via the outside of the central part. Of course, the air flow can also take the reverse path, i.e. flow in towards the outside of the central part via the second fluidic connection and exit again into the surrounding area via the first fluidic connection. In this embodiment, the outside of the central part itself may be visually hidden from an observer in the wearing position.

In one embodiment of the eyeglasses, it is provided that the cable guide opening of the central part is arranged in the region of the imaginary neutral fiber or zero line of the eyeglasses, in particular of the temple and the frame.

Figure 2:
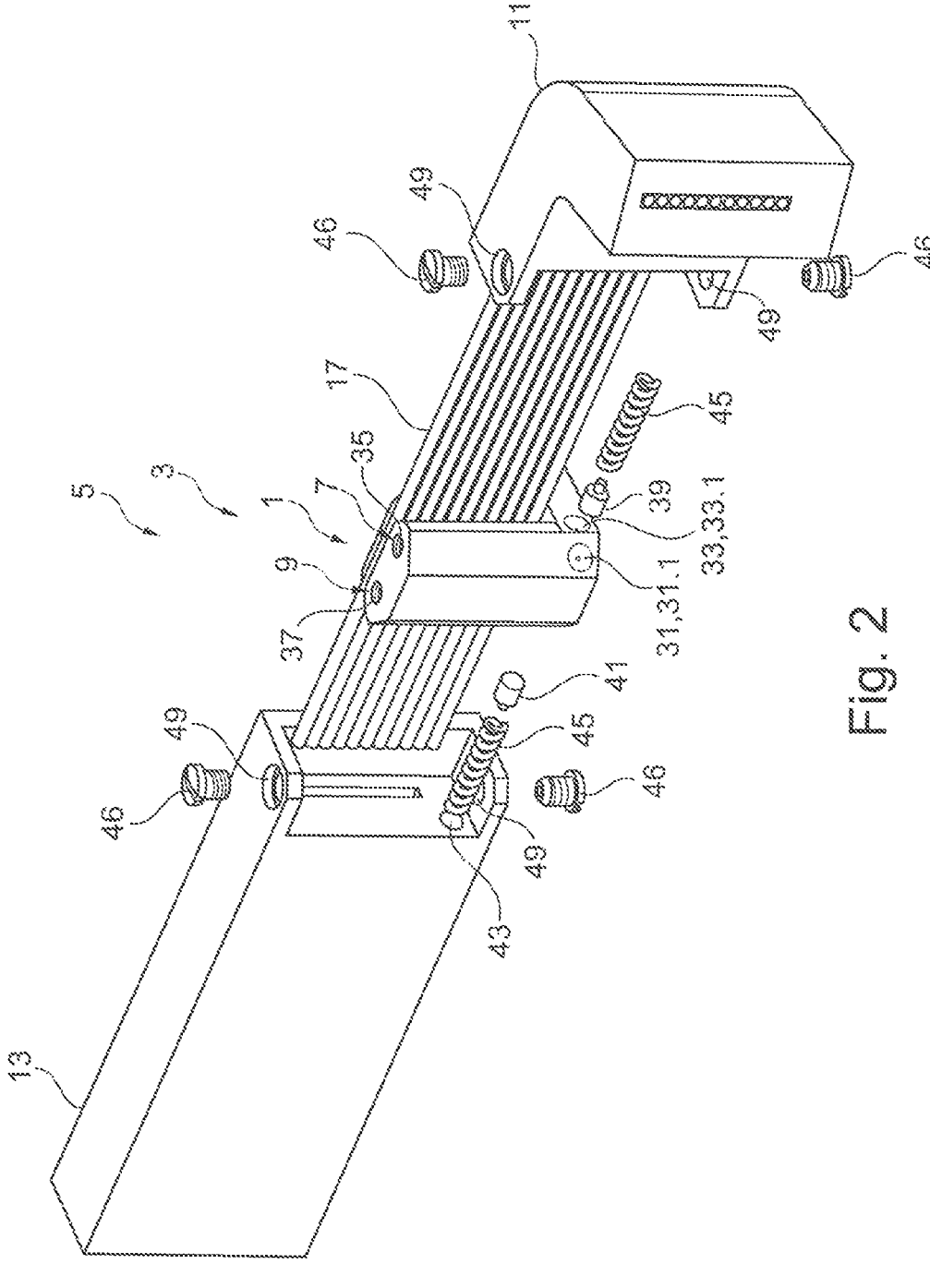
Figure 3:
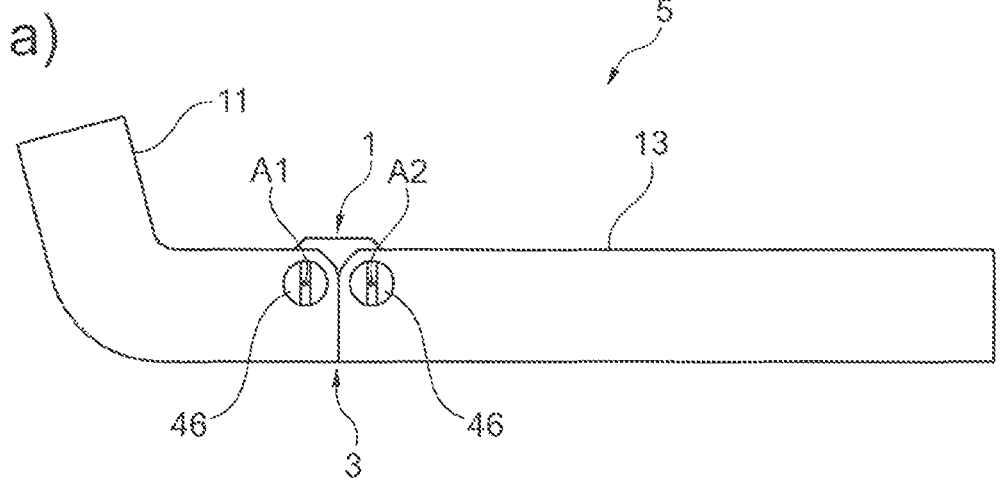
Figure 3:
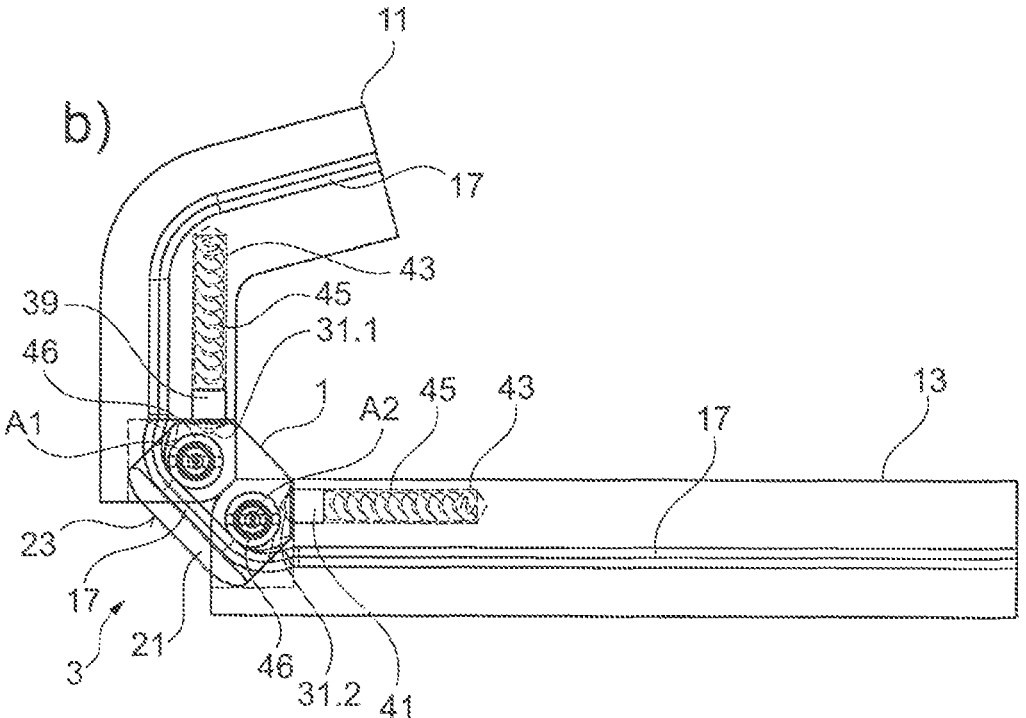
Figure 4:
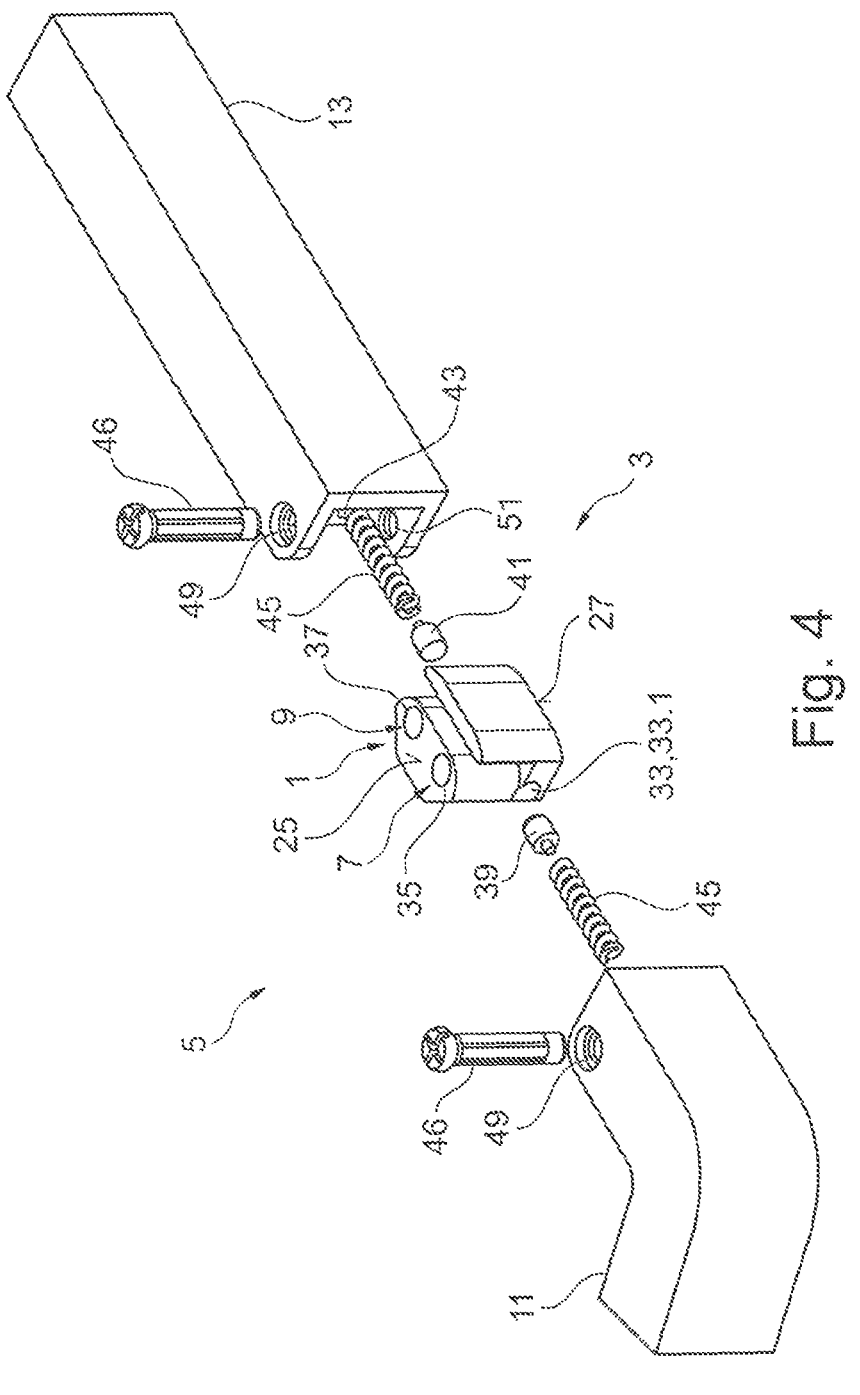
Figure 5:
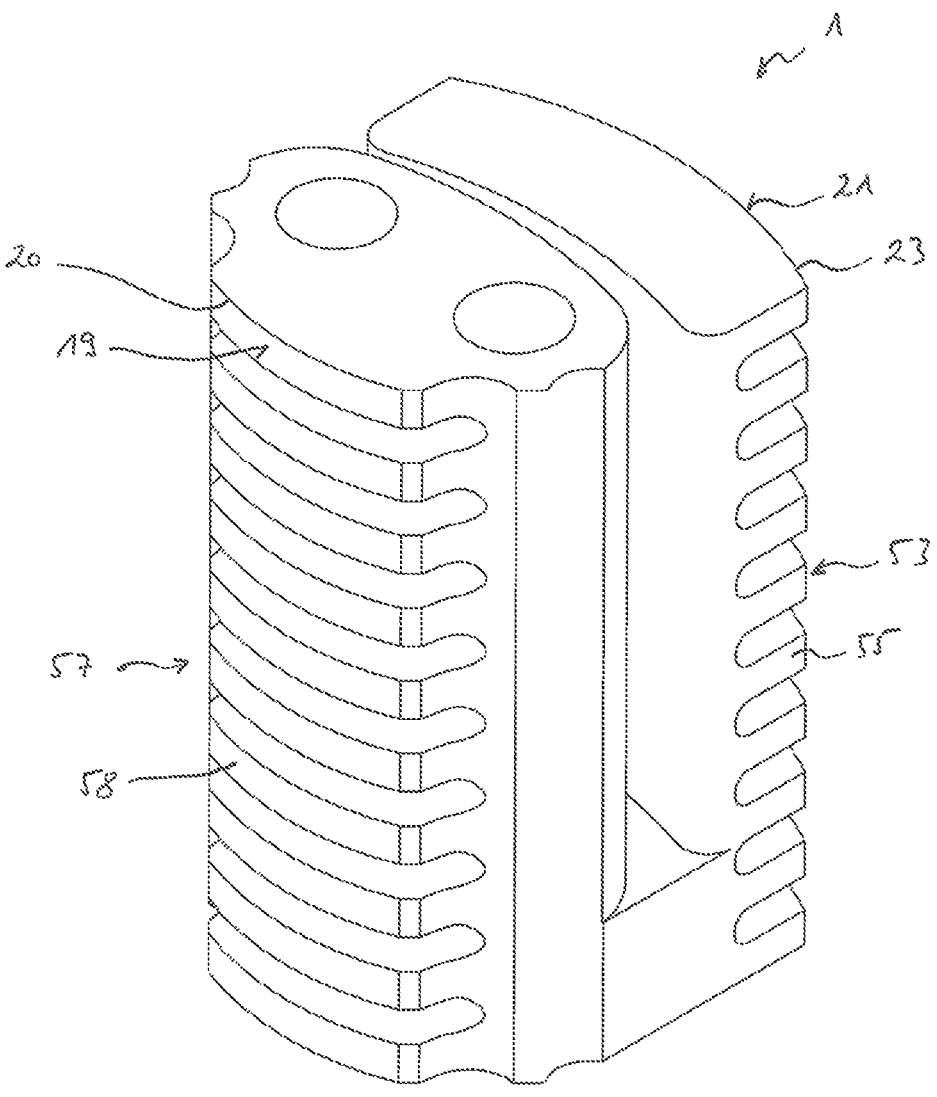
Figure 6:
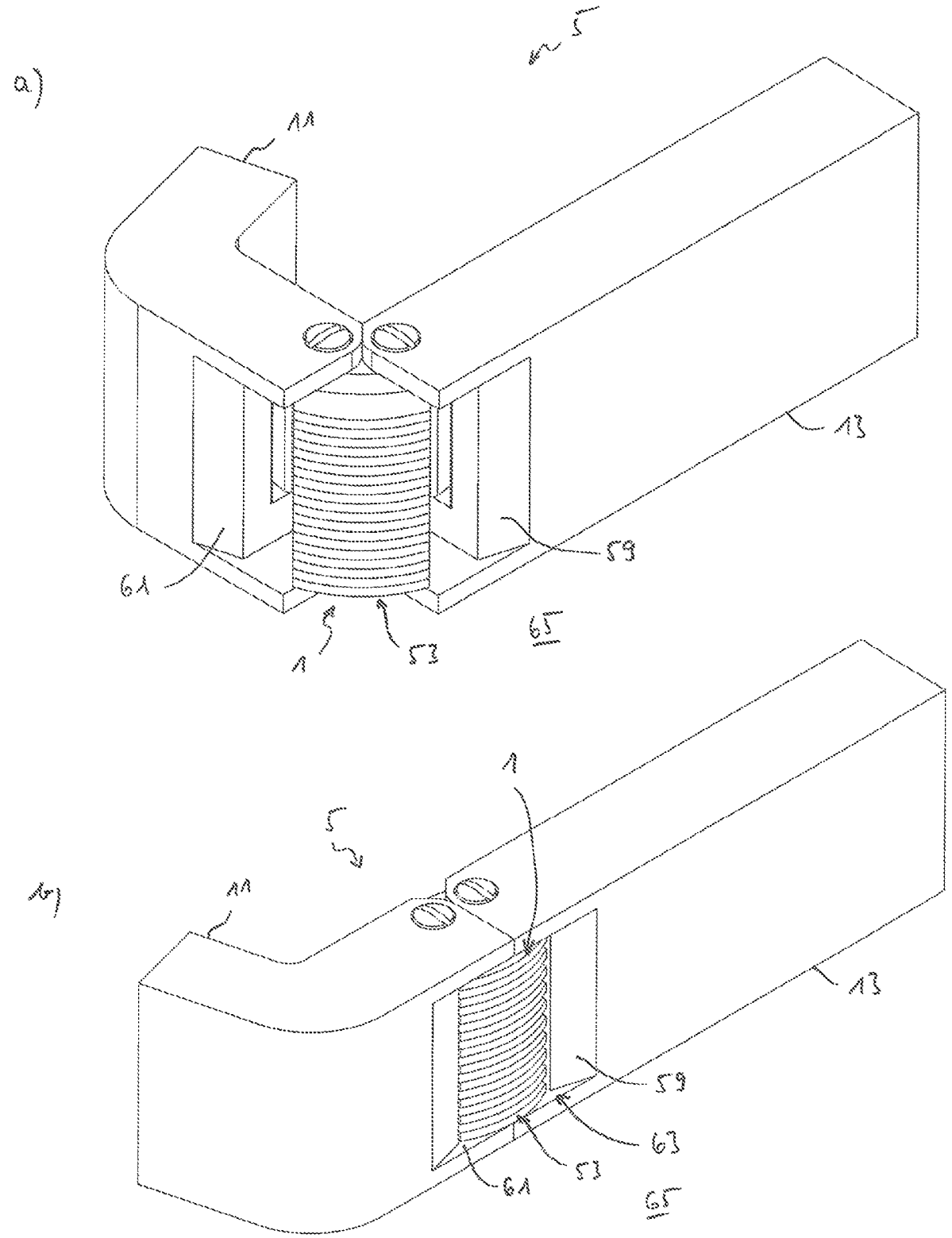
Figure 7:
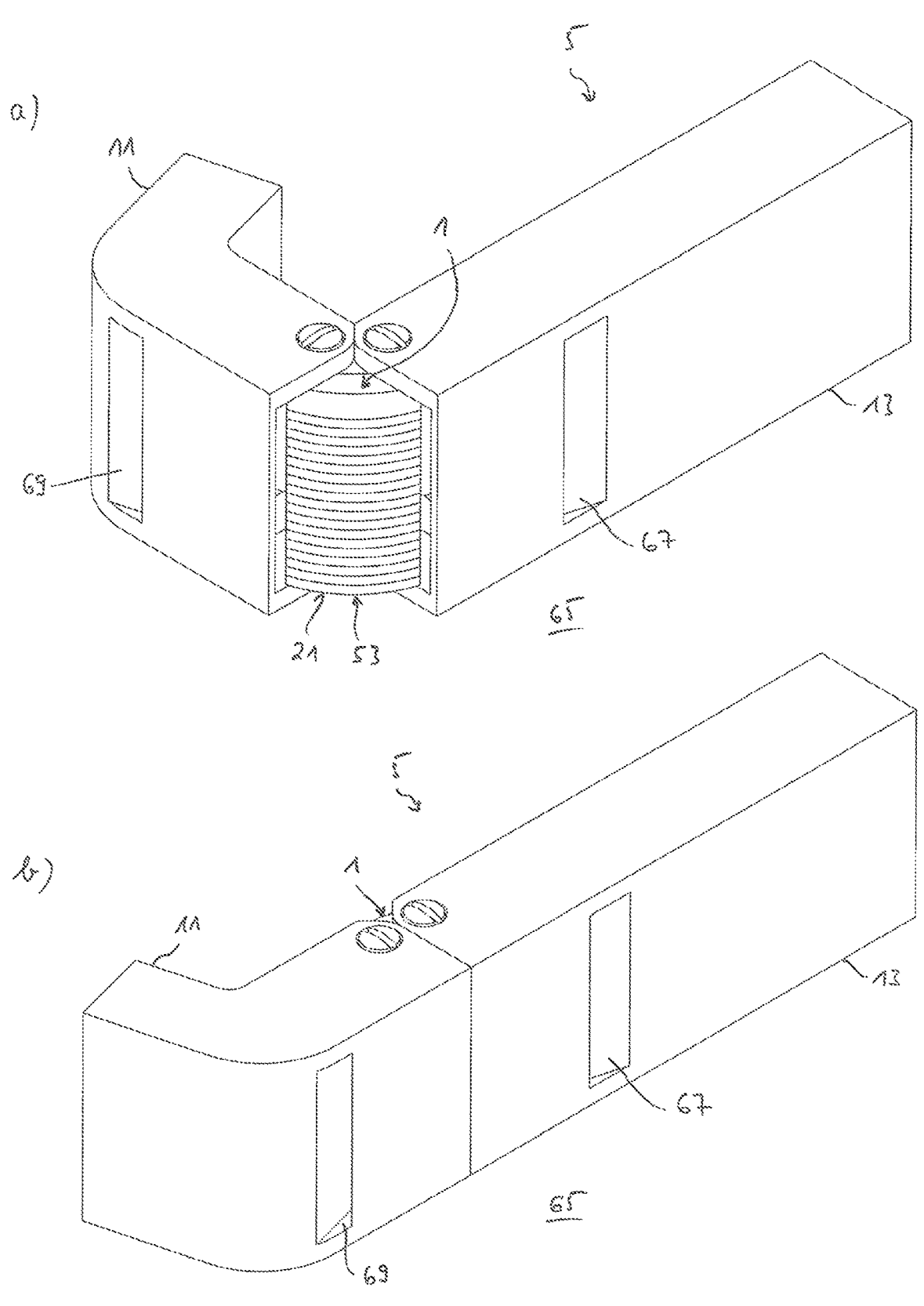

The invention is explained in more detail below with reference to the drawing. Thereby showing:

FIG. 1 an illustration of a first embodiment of a central part for an eyeglass hinge with a cable;

FIG. 2 an exploded view of a detail of a first embodiment of eyeglasses with the central part according to FIG. 1;

FIG. 3 an illustration of the detail of the eyeglasses according to FIG. 2 in two different functional positions;

FIG. 4 an exploded view of a detail of a second embodiment of eyeglasses with a second embodiment of a central part;

FIG. 5 an illustration of a third embodiment of a central part;

FIG. 6 an illustration of a detail of a third embodiment of eyeglasses with the central part according to FIG. 5, and FIG. 7 an illustration of a detail of a fourth embodiment of eyeglasses having the central part according to FIG. 5.

FIG. 1 shows a first embodiment of a central part 1 for an eyeglass hinge 3, in particular shown in FIG. 3, of eyeglasses 5 also at least partially shown in FIG. 3, wherein the central part 1 has a first articulation region 7 and a second articulation region 9. The first articulation region 7 is adapted to connect the central part 1 in an articulated manner about a first articulation axis A1 to a frame 11 of the eyeglasses 5, which is again shown in particular in part in FIG. 3, and wherein the second articulation region 9 is adapted to connect the central part 1 in an articulated manner about a second articulation axis A2 to a temple 13 of the eyeglasses 5, which is also shown in part in FIG. 3. The central part 1 has a cable guide opening 15, which is adapted for passing a cable 17 from the temple 13 to the frame 11 through the central part 1. The cable guide opening 15 is open at least on one side in the direction of the articulation axes A1, A2. As a result, the central part 1 can in particular be arranged very easily on the cable 17, in particular by inserting the cable 17 into the cable guide opening 15 from the open side, or by sliding the central part 1 with the cable guide opening 15 onto the cable 17 from the open side. The central part 1 can just as easily be dismantled again from the eyeglasses 5 and in particular from the cable 17, in particular without having to separate the cable 17 from the frame 11, the temple 13 or an electrical or electronic component to which the cable 17 is connected for this purpose.

Preferably, the central part 1 is configured in one piece.

At the same time, the central part 1 protects the cable 17 in particular from mechanical effects, in particular in a rest position of the temple 13, in particular from effects from outside the eyeglasses 5. The eyeglass hinge 3, which is formed by the temple 13, the frame 11 and the central part 1, can be of simple construction, nevertheless stable, easy to assemble and disassemble, and thereby optimally protect the cable 17.

The central part 1 has an innerside 19 facing the face of a wearer of the eyeglasses when mounted on the eyeglasses 5, which also faces the viewer in FIG. 1a). It also has an outerside 21 facing away from the face of a wearer of the eyeglasses when mounted on the eyeglasses 5, which faces away from the viewer in FIG. 1a), but faces the viewer in FIG. 1b).

In FIG. 1, the central part 1 can thus be seen in particular at a) from a first side, namely looking at the innerside 19, and at b) from the other side, namely looking at the outerside 21. In the two representations according to FIG. 1, it can be seen that the cable guide opening 15 is closed towards the outerside 21. In particular, it has an outer wall 23 on the outerside 21, through which the cable 17 is protected from the outside.

The cable guide opening 15 is preferably also closed towards the innerside 19. In particular, the central part 1 preferably has an inner wall 20 which bounds the cable guide opening 15 inwards.

Upwards, towards an upperside 25, the cable guide opening 15 is open, wherein in particular a slot 26 is formed in the region of the upperside 25, through which the cable 17 can be introduced into the cable guide opening 15.

On an underside 27 opposite the upper side 25 in the direction of the articulation axes A1, A2, the cable guide opening 15 is closed, wherein the central part 1 having here in particular a bottom side 29 for the cable guide opening 15. In particular, the cable 17 can be supported on the bottom side 29.

In the first articulation region 7, the central part 1 has a first first latching element 31.1 of two first latching elements 31 for defining the rest position of the temple 13, and also a first second latching element 33.1 of two second latching elements 33 for defining a wearing position of the temple 13. In the second articulation region 9, the central part 1 comprises a second first latching element 31.2 of the two first latching elements 31, as well as a second second latching element of the two second latching elements 33 hidden from the viewer due to the perspective of the different representations.

The latching elements 31, 33 are all configured here as latching recesses.

On the upperside 25, the central part 1 has a first first screw connection element 35 in the first articulation region 7. In addition, a second first screw connection element is also provided in the first articulation region 7 on the underside 27, although it is hidden from view here due to the perspective. The central part 1 also has a first second screw connection element 37 in the second articulation region 9 on the upperside 25, and also a second second screw connection element in the second articulation region 9 on the underside 27, which is also hidden from the view of the observer. The screw connection elements 35, 37 each serve to produce the articulated connection with the respectively associated eyeglass element, selected from the temple 13 and the frame 11. In the first embodiment example shown here, the screw connection elements 35, 37 are all configured as threads.

Preferably, the central part 1 is formed of metal, which includes being formed of a metal alloy; more preferably, the central part 1 consists of a metal, which in turn includes a metal alloy. Preferably, the central part 1 is formed by a metal powder injection molding process, a sintering process, or a generative manufacturing process. Alternatively, the central part 1 is formed from a plastic. Preferably, it consists of a plastic. The plastic may in particular be a fiber-reinforced plastic. Preferably, the central part 1 is made from the plastic by means of injection molding or generative manufacturing, in particular additive manufacturing.

FIG. 2 shows an exploded view of a detail of the eyeglasses 5 with the frame 11, the temple 13 and the central part 1.

Identical and functionally identical elements are provided with the same reference signs in all figures, so that reference is made in each case to the preceding description.

In the assembled state, the temple 13 is connected to the frame 11 via the central part 1 so as to be pivotally movable between its rest position and its wearing position.

In particular, the frame 11 is hingedly connected to the central part 1 in its first articulation region 7, wherein the temple 13 being hingedly connected to the central part 1 in its second articulation region 9. In this case, the frame 11, the central part 1 and the temple 13 together form the eyeglass hinge 3.

The frame 11 has a first elastically biased counter latching element 39, which is arranged to cooperate with the first first latching element 31.1 of the central part 1 to define the rest position of the eyeglass temple 13. It is further adapted to cooperate with the first second latching element 33.1 to define the wearing position of the temple 13.

The temple 13 comprises a second elastically biased counter latching element 41, suitably arranged to cooperate on the one hand with the second first latching element 31.2 of the central part 1 to define the rest position of the temple 13, and to cooperate with the second second latching element to define the wearing position of the temple 13.

The counter latching elements 39, 41 are configured as spring-loaded pistons guided in a locating hole of the respective associated eyeglass element, wherein only the locating hole 43 provided in the temple 13 can be seen here. However, a corresponding locating hole is also formed in the frame 11. The spring-loaded pistons are pressed under pretension into the respective latching elements 31, 33 formed as latching recesses in the respective assigned functional positions, that is, the rest position on the one hand and the wearing position on the other hand. The counter latching elements 39, 41 are each assigned a helical spring as preloading element 45 here. These preloading elements 45 are also arranged in the respective locating holes 43 and urge the counter latching elements 39, 41, which are configured as pistons, into the respective functional positions.

The articulated connections between the central part 1 and the frame 11, on the one hand, and the temple 13, on the other hand, are effected here by screws 46, each of which engages through holes 49 in the eyeglass elements and cooperates with the screw connection elements 35, 37, configured as threads, in order to produce the respective articulated connections.

In particular, the cable 17 is configured as an electrical cable or as an optical cable, in particular as a ribbon cable or FPC connector.

The eyeglasses 5 are preferably data glasses, in particular augmented reality glasses, or virtual reality glasses. It is also preferably possible that the eyeglasses 5 are configured as sensor eyeglasses, with at least one sensor, in particular for monitoring a physical condition of the wearer of the eyeglasses. Furthermore, it is preferably possible that the eyeglasses 5 are configured as audio eyeglasses, in particular as an audio headset or with an audio headset.

FIG. 3 shows at a) a detailed illustration of the eyeglasses 5 in the wearing position of the temple 13. The temple 13 pivots relative to the frame 11 from the wearing position to the rest position shown at b). In the eyeglass hinge 3 proposed here, this pivoting movement breaks down into two partial pivoting movements about the first articulation axis A1 on the one hand and about the second articulation axis A2 on the other hand.

At b) the temple 13 is shown in its folded rest position. Here it becomes clear, on the one hand, that the cable 17 is bent to a lesser extent in the region of the articulation axes A1, A2 on account of the two partial pivoting movements and the smaller partial pivoting angles associated therewith than if the pivoting movement were to take place directly about a material hinge axis, for example an articulation shaft or the like, the cable 17 being deflected here in particular by twice approximately 45° instead of once by 90°. Secondly, it is clear that the cable 17 is protected outwards, towards the outside 21, by the outer wall 23 of the central part 1 from impacts from outside the eyeglasses 5.

The cable guide opening 15 of the central part 1 is preferably arranged in the region of an imaginary neutral fiber or zero line of the eyeglasses 5, in particular of the temple 13 and the frame 11. In particular, the cable 17 preferably extends along the imaginary neutral fiber or zero line. An elongation and/or compression of the cable 17 is then preferably minimal when pivoting the temple 13 relative to the frame 11 from the wearing position to the rest position and back.

FIG. 4 shows an exploded view of a detail of a second embodiment of the eyeglasses 5 with a second embodiment of the central part 1, in which the cable 17 is omitted for clarity of presentation. In this second embodiment example, the frame 11 and also the temple 13 are narrower in design, with the central part 1 also being narrower. The screw connection elements 35 and 37 are formed here as through holes extending from the upperside 25 to the underside 27 of the central part 1. Accordingly, in comparison with the first embodiment example according to FIG. 2, only two longer screws 46 are provided, each of which, in the assembled state, passes completely through an associated through hole of the central part 1, selected from the first screw connection element 35 and the second screw connection element 37, the screws 46 each being inserted through the through holes 49 in the associated eyeglass elements. The eyeglass elements in turn have counter-connection elements 51, wherein only one counter-connection element 51 of the temple 13 is visible here to the viewer. These counter-connection elements 51 are configured as threads with which the screws 46 cooperate in order to connect the central part 1 to the eyeglass elements in an articulated manner.

FIG. 5 shows an illustration of a third embodiment of a central part 1. The central part 1 has at least one first cooling structure 53, in particular at least one first cooling fin 55, preferably a plurality of first cooling fins 55, on the outer wall 21, in particular on the outer wall 23. For the sake of clarity, only one of the first cooling fins 55 is marked here with the corresponding reference sign.

In the embodiment example shown here, the central part 1 additionally has at least one second cooling structure 57, in particular at least one second cooling fin 58, preferably a plurality of second cooling fins 58, on the inner wall 19, in particular on the inner wall 20.

FIG. 6 shows an illustration of a detail of a third embodiment example of a pair of eyeglasses 5 with the central part 1 according to FIG. 5. In this third embodiment example, the eyeglasses 5 has a first partial recess 59 at the temple 13, and also has a second partial recess 61 at the frame 11.

At a) it is shown that the partial recesses 59, 61 are pivoted away from each other in the rest position so that the first cooling structure 53 is freely accessible.

At b), it is shown that the partial recesses 59, 61 are pivoted towards each other in the wearing position such that they jointly form a heat dissipation recess 63 through which the first cooling structure 53 is accessible from a surrounding area 65 of the eyeglasses 5. In this way, heat can be dissipated from the first cooling structure 53 through the heat dissipation recess 63 into the surrounding area 65.

FIG. 7 shows an illustration of a detail of a fourth embodiment of an eyeglasses 5 with the central part 1 according to FIG. 5, wherein the eyeglasses are shown at a) in the rest position and at b) in the wearing position. In this fourth embodiment example of the eyeglasses 5, the temple 13 has a first heat dissipation recess 67, which establishes a first fluidic connection to the outside 21 of the central part 1 and thus to the first cooling structure 53, wherein at the same time the frame 11 has a second heat dissipation recess 69, which establishes a second fluidic connection to the first cooling structure 53. Overall, a flow path is formed in this manner through which air can flow from the surrounding area 65 to the first cooling structure 53 via the first fluidic connection and exit back into the surrounding area 65 via the second fluidic connection. In this way, a cooling air flow can be realized via the first cooling structure 53. The air flow can, of course, also take the reverse path, that is, flow in via the second fluidic connection towards the first cooling structure 53 and exit again via the first fluidic connection into the surrounding area 65. In this embodiment, the outside 21 and thus also the first cooling structure 53 of the central part 1 are visually concealed from an observer in the wearing position.

The invention claimed is:

1. A central part for an eyeglass hinge, having
  a first articulation region adapted to connect the central part in an articulated manner about a first articulation axis to a frame of eyeglasses,
  a second articulation region adapted to articulate the central part about a second articulation axis to a temple of the eyeglasses, and with
  a cable guide opening penetrating the central part perpendicular to the articulation axes, which is adapted for passing a cable from the temple to the frame through the central part, and wherein
  the cable guide opening is further open at least on one side in the direction of the articulation axes,
  the articulation axes lie in a first plane and the cable guide opening extends along a second plane, and
  the first plane and the second plane are adjacent but offset.

2. The central part according to claim 1, wherein the central part has an innerside facing the face of a wearer of the eyeglasses in the mounted state on an eyeglasses and an outerside facing away from the face of the wearer, wherein the cable guide opening is closed towards the outerside.

3. The central part according to claim 1, wherein the central part has, at least in an articulation region selected from the first articulation region and the second articulation region, a first latching element for defining a rest position of the temple and a second latching element for defining a wearing position of the temple.

4. The central part according to claim 3, wherein at least one latching element, selected from the first latching element and the second latching element, is configured as a latching recess.

5. The central part according to claim 1, wherein the central part has in the first articulation region and in the second articulation region in each case a first latching element for defining the rest position of the temple and a second latching element for defining the wearing position of the temple.

6. The central part according to claim 1, wherein the central part, viewed in the direction of the articulation axes, has an upperside and an underside, wherein the central part, at least in an articulation region selected from the first articulation region or the second articulation region, at least on one side, selected from the upperside or the underside, has a screw connection element for producing an articulated connection with a respectively assigned eyeglass element selected from the temple or the frame.

7. The central part according to claim 6, further comprising a screw connection element for producing the articulated connection, wherein the screw connection element is configured as a thread or as a through hole.

8. The central part according to claim 1, wherein the central part is formed from a metal or a plastic.

9. The central part according to claim 1, wherein the cable guide opening is formed open in the direction of the articulation axes on a first side and closed on an opposite second side, wherein the central part has a bottom side for the cable guide opening on the second side.

10. Eyeglasses, having the central part according to claim 1, wherein the temple being connected to the frame via the central part, and is such that it can pivot between a rest position and a wearing position.

11. The eyeglasses according to claim 10, wherein the frame is hingedly connected to the central part in the first articulation region thereof, wherein the temple is hingedly connected to the central part in the second articulation region thereof, and wherein the frame, the central part and the temple jointly form an eyeglass hinge of the eyeglasses.

12. The eyeglasses according to claim 10, wherein at least one eyeglass element selected from the temple and the frame comprises a resiliently biased counter latching element arranged to cooperate with a first latching element of the central part associated with the eyeglass element to define the rest position and to cooperate with a second latching element of the central part associated with the eyeglass element to define the wearing position.

13. The eyeglasses according to claim 12, wherein the counter latching element is configured as a spring-loaded piston guided in a locating hole, wherein the first latching element and the second latching element are each formed as latching recesses into which the spring-loaded piston is urged under pretension in the respectively associated functional position selected from the rest position and the wearing position.

14. The eyeglasses according to claim 10, wherein the cable is guided in the cable guide opening of the central part from the temple to the frame.

15. The eyeglasses according to claim 10, wherein the cable is configured as a ribbon cable or as a flexible printed circuit [FPC] connector.

* * * * *